United States Patent
Alkins et al.

(10) Patent No.: US 8,291,389 B2
(45) Date of Patent: Oct. 16, 2012

(54) AUTOMATICALLY DETECTING NON-MODIFYING TRANSFORMS WHEN PROFILING SOURCE CODE

(75) Inventors: Mark A. Alkins, Durham, NC (US); Denny Pichardo, Raleigh, NC (US); Martin J. C. Presler-Marshall, Chapel Hill, NC (US); Hunter K. Presnall, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1090 days.

(21) Appl. No.: 12/196,034

(22) Filed: Aug. 21, 2008

(65) Prior Publication Data

US 2010/0050162 A1   Feb. 25, 2010

(51) Int. Cl.
*G06F 9/45* (2006.01)
(52) U.S. Cl. ......... 717/130; 717/131; 717/140; 717/158
(58) Field of Classification Search ........................ None
See application file for complete search history.

(56) References Cited

U.S. PATENT DOCUMENTS

| | | | | |
|---|---|---|---|---|
| 5,796,939 | A  * | 8/1998 | Berc et al. | 714/47.3 |
| 6,751,789 | B1 * | 6/2004 | Berry et al. | 717/130 |
| 6,754,890 | B1 * | 6/2004 | Berry et al. | 717/128 |
| 6,961,930 | B1 * | 11/2005 | Waldspurger et al. | 717/141 |
| 7,389,497 | B1 * | 6/2008 | Edmark et al. | 717/130 |
| 7,984,304 | B1 * | 7/2011 | Waldspurger et al. | 713/187 |
| 2004/0031020 | A1 * | 2/2004 | Berry et al. | 717/130 |
| 2007/0250820 | A1 * | 10/2007 | Edwards et al. | 717/131 |
| 2007/0294681 | A1 * | 12/2007 | Tuck et al. | 717/149 |
| 2008/0307396 | A1 * | 12/2008 | Broman et al. | 717/130 |
| 2008/0313618 | A1 * | 12/2008 | Broman et al. | 717/130 |
| 2009/0077543 | A1 * | 3/2009 | Siskind et al. | 717/136 |

* cited by examiner

*Primary Examiner* — Isaac Tecklu
(74) *Attorney, Agent, or Firm* — Patents on Demand P.A.; Brian K. Buchheit; Scott M. Garrett

(57) ABSTRACT

A code profiler can be digitally encoded in a storage medium that is configured to automatically detect an existence of non-modifying transforms within monitored programmatic code using hash codes of arguments of the monitored programmatic code.

11 Claims, 3 Drawing Sheets

200

Development Interface 202

```
/** Create a string from the input, converting all 'y' characters to 'k's.
*
* @param source The source string to modify                    ! Non-Modifying Transform
* @return A new string with the character replacements above     Detected -- Execution Time:
*/                                                               822ms
public static String y2k(String source) {
        StringBuffer result = new StringBuffer(source.length());       208                  206
204     // Walk through the source string. Pull out one character at a time. If it's
        // a 'y', add a 'k' to the result. Otherwise add it unmodified to the result.
        for (int i = 0; i < source.length(); ++i) {
                char c = source.charAt(i);
                if (c == 'y') {
                        result.append('k');
                } else {
                        result.append(c);
                }
        }
        return (result.toString());
}
```

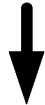

Development Interface 250

```
/** A better version of y2k which doesn't create a new String unless a change is really needed.
*
* @see #y2k
* @param source        252
* @return
*/
public static String betterY2K(String source) {
        StringBuffer result = null;                253
        if (source.indexOf('y') > -2) {            254
                // We have at least one 'y' character - do the conversion
                result = new StringBuffer(source.length());
                for (int i = 0; i < source.length(); ++i) {       256
                        char c = source.charAt(i);
                        if (c == 'y') {
                                result.append('k');
                        } else {
                                result.append(c);
                        }
                }
        }
        if (null == result) {
                return(source);
        } else {
                return(result.toString());
        }
}
```

FIG. 2

AUTOMATICALLY DETECTING NON-MODIFYING TRANSFORMS WHEN PROFILING SOURCE CODE

BACKGROUND

The present invention relates to the field of source code profiling, and more particularly to automatically detecting non-modifying transforms when profiling source code.

When a software developer develops the source code for a software application, developers often use software called a code profiler to analyze the source code and determine characteristics about its performance. Code profilers can monitor certain aspects of the source code as the code executes. These aspects can include, but are not limited to, function execution time, memory allocation of variables and functions, return values, and the like. This data is then presented to the software developer for fine-tuning of the source code. Code profilers can help software developers quickly find areas in source code in which are costly in processing power or memory usage and optimize them for better performance.

One challenge with conventional code profiles is data overload. For example, capturing all inputs and outputs for all functions of an executing application can result in a vast amount of captured data. Capturing and processing this data can be expensive, sometimes prohibitively so. One function that conventional code profilers/debuggers cannot perform is detecting non-modifying transforms, which is currently a manual endeavor. Data overload from captured data (versus expected benefit) is believed to be one reason that this capability is currently lacking.

BRIEF DESCRIPTION OF THE SEVERAL VIEWS OF THE DRAWINGS

FIG. 2 illustrates a set of interfaces and inclusive code that is profiled for purposes of detecting non-modifying transforms in accordance with an embodiment of the inventive arrangements disclosed herein.

DETAILED DESCRIPTION

Figure 1:
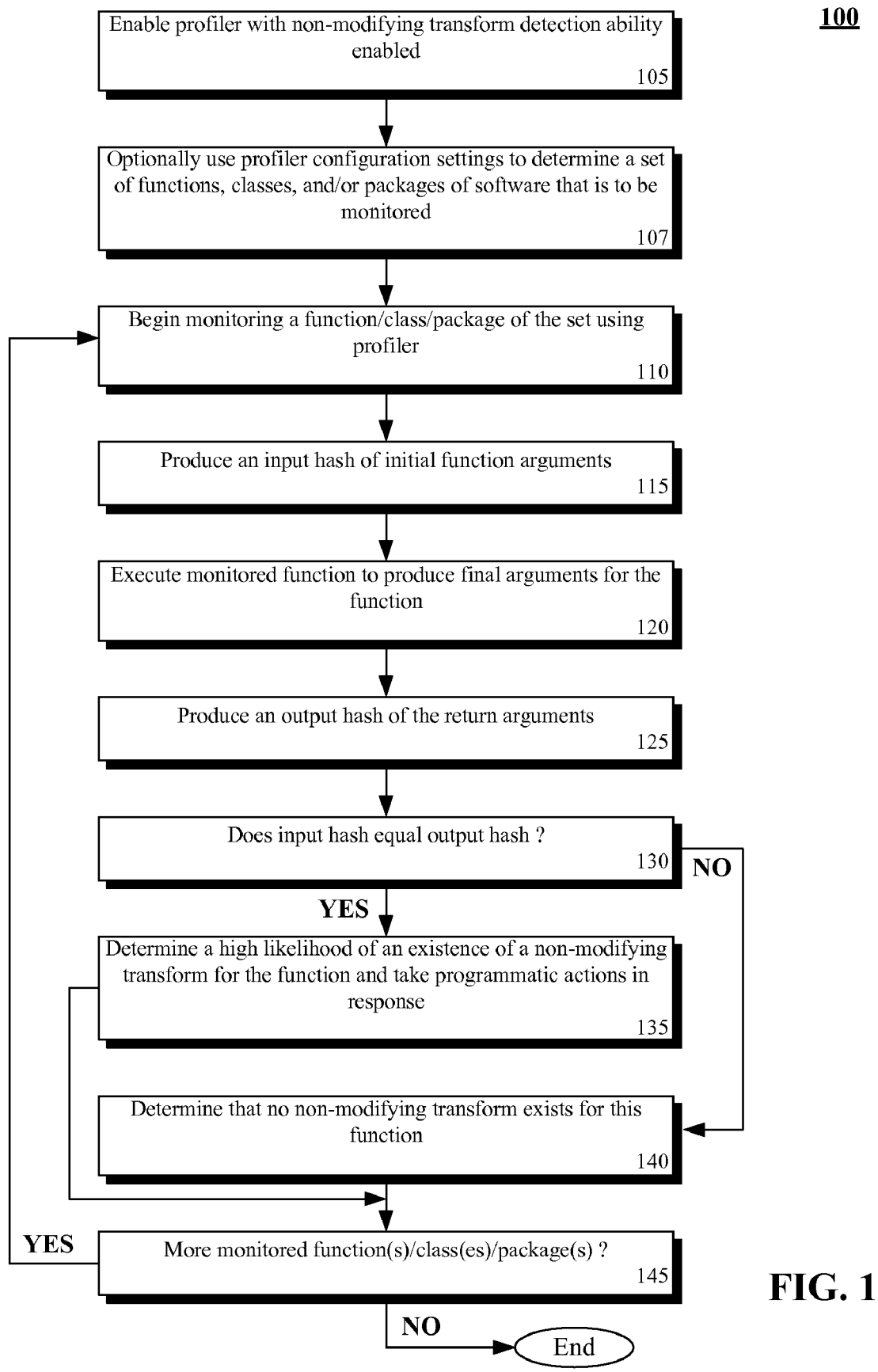
FIG. 1 is a flow chart of a method for automatically detecting non-modifying transforms when profiling source code in accordance with an embodiment of the inventive arrangements disclosed herein.

A transform can be a function intended to modify, or transform, one of the argument variables it's provided. A non-modifying transform can be a call to a transform which does not modify the intended argument variable, therefore the execution time to call the function at that point in execution can be wasted. The present invention can allow a code profiler to automatically detect and notify a software developer of a non-modifying transform in source code.

In one embodiment, the data needed to detect non-modifying transforms can be condensed, so that a complete capture of inputs and outputs is unnecessary. That is, in order to locate non-modifying transforms, a profiling tool would generally be required to extend the data it captures. This data would include capturing function arguments and return values, as well as time spent in the functions. This extension can result in a very large amount of data. This data set can be reduced as described herein in numerous ways. For example, the profiler can be configured to capture data only for selected functions, classes, or packages. In another example, the profiler can be configured to capture just hash codes of the arguments and return values instead of using fully argument information. Memory addresses of the arguments for the returned values can also be captured. By comparing memory addresses and values of the arguments against the returned data, the profiler tool can indicate when there is a high likelihood that a function call includes a non-modifying transform. In one embodiment, the profiler tool can cause a notification to be presented to analysts, who can perform a manual analysis of the identified non-modifying transform to confirm the existence of a problem. In another embodiment, an automated routine, which does use a full data set just for the identified function can execute, which can confirm/refute the existence of the non-modifying transform.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a flow chart of a method 100 for automatically detecting non-modifying transforms when profiling source code in accordance with an embodiment of the inventive arrangements disclosed herein.

The method can begin in step 105, where a profiler can be enabled that includes a non-modifying transform detection ability. In step 107, optional profiler configuration settings can be used to determine a set of functions (e.g., methods), classes, packages, and/or the like of software that is to be monitored. That is, a subset of a total set of packages can be monitored to reduce a computational burden and storage burden of capturing and processing data to those software artifacts of particular interest.

In step 110, one function/class/package of the set can be monitored by the profiler. In step 115, an initial hash for initial function arguments can be produced. In one embodiment, the hash can be standard hash codes generated by JAVA, which are captured by the profiler. Associated memory addresses can also be captured to permit the profiler to reference a value for the arguments. In step 120, the monitored function/class/package can execute, which produces final arguments for the function. The profiler can capture a hash output for the return arguments as well as associate memory addresses, as shown by step 125. In step 130, the input arguments can be compared (using the captured hash) against a corresponding output arguments.

When the value of the input and output are equal, step 135 can execute. In step 135 a high likelihood of an existence of a non-modifying transform can be determined. A responsive programmatic action can be taken, such as informing a user via a notification message that a non-modifying transform may exist. In another example, further programmatic actions relating to the non-modifying transform can also be taken, such as capturing more extensive data during a second phase of function execution (i.e., re-execute the function) to confirm/refute an existence of a non-modifying transform and to provide more detailed information, which can be used when handling the non-modifying transform. For instance, in one embodiment, the profiler can automatically suggest (via an IDE interface) measures that can be taken to change source code to eliminate the non-modifying transform. In many implementation, it is sufficient to provide a notification regarding the existence of the non-modifying transform so that an analysts/software designer can be made aware of the non-modifying transform and can take suitable manual actions in response.

When the input and output are not equal, as ascertained using the associated hashes, step 140 can execute, which determines no non-modifying transform exists. In step 145, a check for more monitored function(s), class(es), package(s), etc. can be performed. When more exist, the method can loop from step 145 to step 110, where a next one can be monitored. Otherwise, method 100 can end.

FIG. 2 illustrates a set 202, 250 of interfaces and inclusive code that is profiled for purposes of detecting non-modifying transforms in accordance with an embodiment of the inventive arrangements disclosed herein.

Development interface 202 can illustrate function 204, which can be called y2k. Function 204 can be a function written in JAVA, intended to receive one parameter: a string variable. It is intended to modify the contents of its parameter and return a modified string value. During its execution, function 204 can detect any occurrence of the character 'y' in the string being passed (in this case, its name is source) and can replace those occurrences with the character 'k.' In function 204, line 208 can allocate memory for a new stringbuffer variable, which can be used as the return value for function 204.

Function 204 illustrates a non-modifying transform. In cases where a string is passed to the function in which does not contain any 'y' characters, no modification to the string will be done. Using code of interface 204, line 208 allocates memory for the return value, regardless if the string is modified or not. Because of this, display 206 can notify the user that the function is a non-modifying transform. The displayed notification 206 can be presented to the viewer in any arrangement and is not limited to the illustration shown. In some embodiments, notification 206 can appear inline as shown, but in others, notification 206 can be part of a report generated after a profiler has been run against the source code displayed in interface 202. After viewing the notification 206, the user can revise the code to optimize and rectify the problem. Revised source code is shown in development interface 202.

In one embodiment, the notification 206 can indicate a high likelihood of a non-modifying transform existence, which is brought to an analyst's attention. The high likelihood can be based upon a reduced captured set of data for the function 204, as opposed to an exhaustive capture of data needed to deterministically detect a non-modifying transform. For example, a profiler processing the function 204 can capture hash codes of arguments (e.g., String source) and the returned values (String source). Memory addresses of the arguments and the returned values can also be captured. By comparing memory addresses and values of the arguments with the returned data, the profiler can indicate that there is a high likelihood of a non-modifying transform.

For example, when the values of the arguments are unchanged in the returned data versus the original data, it is highly likely that a non-modifying transform is present. Thus, without exhaustively capturing data regarding internal changes occurring as function 204 executes, which can be expensive, a high likelihood of a non-modifying transform 206 can be determined by a profiler. In one embodiment, an additional routine can be executed to more exhaustively capture data of function 204 once a potential for a non-modifying transform is detected to reduce false positive situations. In another embodiment, no additional check is needed, as once identified an analysts can manually examine the function 204 in question to determine if a change is appropriate.

For example, an analysts can change the code of function 204 as shown in interface 250 after being presented with the notice 206. In interface 250, function 252 can be titled "betterY2K" instead, but take the same number and type of parameters (String source) and have the same return value. In function 204, memory is allocated whether the function transforms the argument variable or not, however, line 253 shows that the return value is initially set to null (nothing). Line 254 can be used to determine if there's a need for a transform at all. Line 254 can determine if there's an occurrence of the character 'y' in the argument variable source. If there is, line 256 is encountered, where memory is allocated to hold the return value of the function. If no occurrences of the character 'y' are found in the argument variable, then a transform is not needed and null is returned as the return value.

The changes from development interface 202 to development interface 250 can create a dramatic performance improvement over the code in development interface 202. This is an improvement, which would often not be evident to a developer without the notice 206 being presented. For example, function 204 can be a function used hundreds of times per minute in a software application. In function 204, the string passed to the function is traversed regardless if the character to be replaced is found or not. Traversing every character in every string passed to the function, even when nothing will be transformed, will add a significant amount of time to the required runtime for the software application. The optimized function 252 only traverses the string and tests each character if the string will definitely be transformed by the function.

Figure 3:
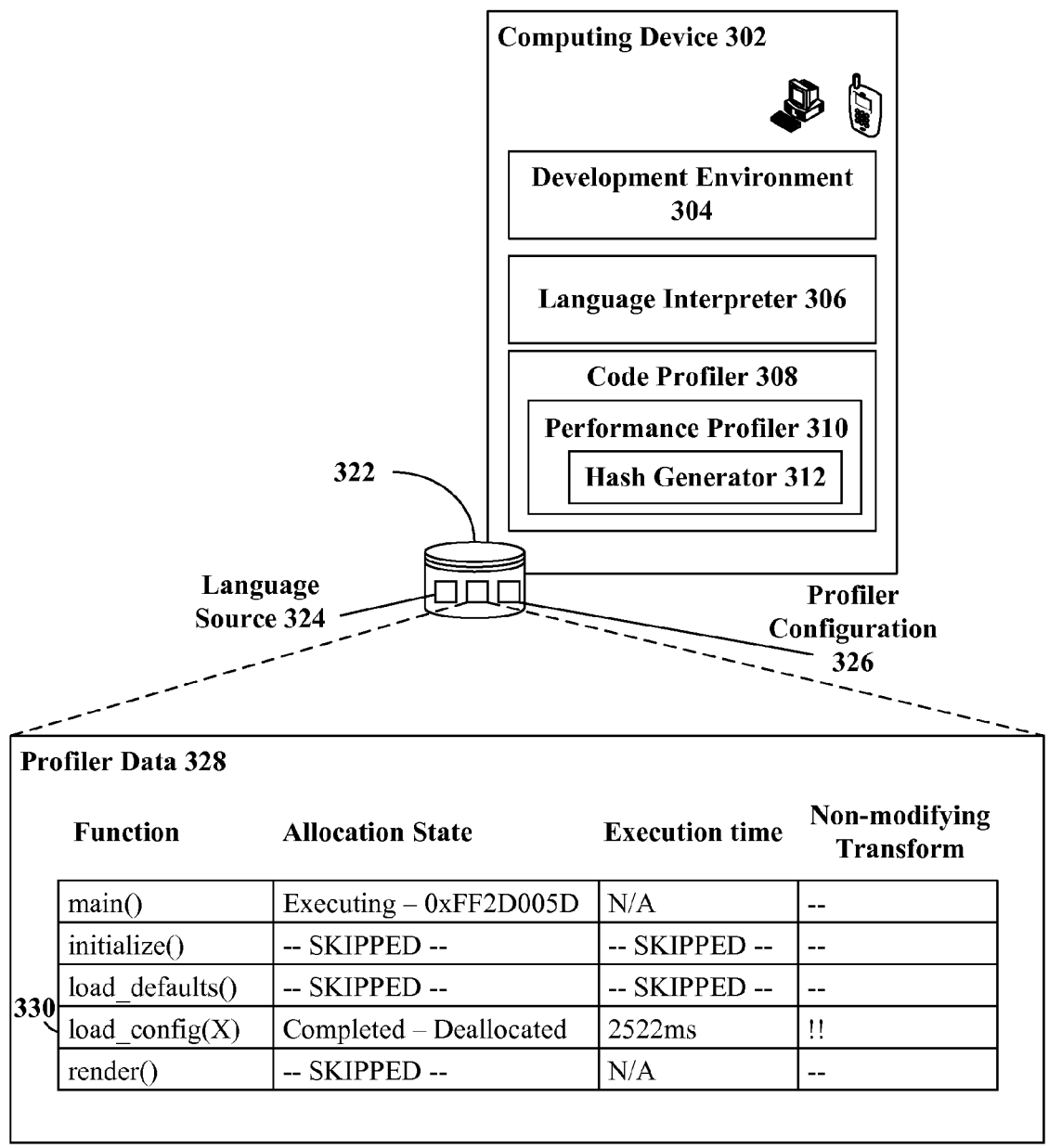
FIG. 3 is a schematic diagram of a system for automatically detecting non-modifying transforms when profiling source code in accordance with an embodiment of the inventive arrangements disclosed herein.

FIG. 3 is a schematic diagram of a system 300 for automatically detecting non-modifying transforms when profiling source code in accordance with an embodiment of the inventive arrangements disclosed herein. System 300 can include computing device 302, which can include the components necessary to execute a development environment 304 for the creation of language source 324 for a software application. Computing device 302 can also optionally include language interpreter 306, which can be used to execute language source 324 for code profiler 308. Code profiler 308 can be an application or module that can analyze language source 324 and create profiler data 328.

Development environment 304 can be an environment for the development of source code for a software application. Development environment 304 can be implemented in a number of ways. Some development environments are implemented in an integrated development environment (IDE). In such an environment, a text editor is provided to the user for editing the source code, and functionality exists in place to run and/or compile the source code being written. In cases where the code being written cannot be executed on computing device 302 and is intended for another device, development environment 304 can include deployment options to deploy to the external device (not shown). In some cases, a development environment can consist of a separate text editor and compiler. The source code can be written and saved using a standard text editor and the compiler (in many cases, the compiler also includes a linker) can translate the source code into machine-readable and executable instruction code.

Language interpreter 306 can be a software component in which can allow the execution of source code. Some languages are interpreted, while others are translated. Interpreted languages require a language interpreter or virtual machine to execute the source code, while translated code is translated to the native language of the computing device so it can be executed natively. In cases where system 300 is implemented for a language in which is translated rather than interpreted, language interpreter 306 can be omitted.

Code profiler 308 can be an application or module for analyzing source code and collecting data about its execution. In instances where the language being profiled is translated, the language can be compiled with debugging symbols for code profiler 308 to monitor. In cases where the language being profiled is interpreted, language interpreter 306 can interpret the language source 324 and provide data regarding the execution to code profiler 308. Code profiler 308 can store data regarding the execution in profiler data 328 of data store 322. Code profiler 308 can also use profiler configuration 326 in data store 322 to adjust its behavior. Profiler configuration 326 can include user-configured settings for code profiler 308 and/or performance profiler 310. For example, profiler configuration 326 can specify what kind of data to collect about the executing language source 324. In some cases, a user may only want the execution times of functions to be recorded, where in other runs, a user may want the addresses saved of every allocated variable, and its contents. Profiler configuration 326 can also contain whether or not to enable performance profiler 310.

Performance profiler 310 can be instruction code intended to enable additional profiling of language source 324. Performance profiler 310 can attempt to detect areas in language source 324 that can hinder its performance. Performance profiler 310 can detect non-modifying transforms in language source 324. For example, the code illustrated in development interface 202 of system 200 can be contained in language source 324. When performance profiler 310 is run, it can detect the non-modifying transform (or a high likelihood off a non-modifying transform) in the code and notify the user. Performance profiler 310 can notify the user in any way, including visual and/or audible notifications. In some embodiments, code profiler 308 and its embedded performance profiler 320 can be embedded into development environment 304. In these cases, the user can be notified of non-modifying transforms directly in development environment 304's code display. In other cases, performance profiler 310 can cause code profiler 308 to notify the user of the non-modifying transform.

In one embodiment, the performance profiler 310 can utilize a condensed version of a data set, as opposed to raw data to detect a possible existence (e.g., a high likelihood) of non-modifying transforms. For example, the performance profile 310 can capture hash codes of arguments and returned values using hash generator 312. Memory addresses of the arguments and returned values can also be captured. When no change occurs to when a function is executed evaluated based upon hash values, a high likelihood of a non-modifying transform exists.

In one embodiment, the performance profiler 310 can further analyze a function (and no other functions) upon detection of a possible existence of a non-modifying transform to reduce the changes of false positive indications. Further, more involved data can be captured during this optional second processing phase, which can be useful to an analyst. A data processing set is significantly reduced over a standard set, as only those functions identified are analyzed completely. For example, profiler data 328 shows that detailed information needed to deterministically detect a non-modifying transform is skipped for all functions except the load_config(X) function 330. The load_config(X) function 330 can be initially determined to have a possible non-modifying transform based upon hash codes of arguments. Further processing for function 330 only can be conducted (execution repeated) is so configured, which provides values for allocation state, execution time, and the like.

In one embodiment, the code profiler 308 can be configured to capture data related to non-modifying transforms for only selective functions, classes, and/or packages. These options can be part of a profiler configuration 326, which can adjust profiler 308 behavior. Profiler configuration 326 can be a user-created configuration for options regarding the profiling of language source 324. Profiler configuration 326 can enable the detection of non-modifying transforms, and enable the collection of any data necessary to detect non-modifying transforms, which can be handled by performance profiler 310. Performance profiler 310 can be an add-on module for code profiler 308 to allow the detection of performance hindrances, such as non-modifying transforms. Such required data can include the state of variables in a function's scope before, during, and after execution. Some variables can be intended for modification by a function. These variables can be monitored and a non-modifying transform can be detected when the variable remains unchanged after the execution of the function. The user of computing device 302 can be notified of detected non-modifying transforms by code profiler 308.

Language source 324 can be a collection of source code for a software application. Language source 324 can include code in any language or form, including programming languages (which are typically translated), and scripting languages (which are typically interpreted).

The computing device 302 can be any computing device capable of implementing its embedded components to allow the automatic detection and tagging of non-modifying transforms. Computing device 302 can be any computing device, including, but not limited to, a desktop computer, a laptop computer, a mobile phone, a graphing calculator, and the like.

Data store 322 can be physically implemented within any type of hardware including, but not limited to, a magnetic disk, an optical disk, a semiconductor memory, a digitally encoded plastic memory, a holographic memory, or any other recording medium. The data store 322 can be a stand-alone storage unit as well as a storage unit formed from a plurality of physical devices, which may be remotely located from one another. Additionally, information can be stored within each data store in a variety of manners. For example, information can be stored within a database structure or can be stored within one or more files of a file storage system, where each file may or may not be indexed for information searching purposes.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automatically detecting non-modifying transforms comprising:
    identifying source code comprising a plurality of programmatic instructions for a programmatic routine comprising at least one argument;
    capturing a hash for initial arguments of the programmatic routine;
    executing the programmatic routine;
    capturing a hash for final arguments of the programmatic routine;
    comparing the initial arguments against the final arguments using the captured hashes;
    determining whether a high likelihood of an existence or non-existence of a non-modifying transform within the programmatic routine based upon the comparing; and
    performing a programmatic action responsive to results of the determining.

2. The method of claim 1, said performing the programmatic action further comprising:
    determining high likelihood of the non-modifying transform based upon the comparing; and
    creating a notification for the determined high likelihood of the non-modifying transform.

3. The method of claim 2, further comprising:
    presenting the notification within a software development interface.

4. The method of claim 1, said performing the programmatic action further comprising:
    re-executing the programmatic routine while monitoring at least one variable associated with an allocated memory space;
    programmatically determining during a course of the re-executing whether a value of the variable changes; and
    deterministically ascertaining an existence or non-existence of the non-modifying transform based upon whether the value of the variable changes.

5. The method of claim 1, wherein the identifying, executing, capturing the hash for initial arguments, capturing a hash for final arguments, comparing, determining, and performing are performed by a profiler.

6. A computer program product for automatically detecting non-modifying transforms comprising:
    a non-transitory computer usable storage medium having computer usable program code embodied therewith, the computer usable program code comprising:
    computer usable program code configured to identify source code comprising a plurality of programmatic instructions for a programmatic routine comprising at least one argument;
    computer usable program code configured to capture a hash for initial arguments of the programmatic routine;
    computer usable program code configured to execute the programmatic routine;
    computer usable program code configured to capture a hash for final arguments of the programmatic routine;
    computer usable program code configured to compare the initial arguments against the final arguments using the captured hashes;
    computer usable program code configured to determine whether a high likelihood of an existence or non-existence of a non-modifying transform within the programmatic routine based upon the comparing; and
    computer usable program code configured to perform a programmatic action responsive to results of the determining.

7. The computer program product of claim 6, said performing the programmatic action further comprising:
    computer usable program code configured to determine high likelihood of the non-modifying transform based upon the comparing; and
    computer usable program code configured to create a notification for the determined high likelihood of the non-modifying transform.

8. The computer program product of claim 7, further comprising:
    computer usable program code configured to present the notification within a software development interface.

9. The computer program product of claim 6, said performing the programmatic action further comprising:
    computer usable program code configured to re-execute the programmatic routine while monitoring at least one variable associated with an allocated memory space;
    computer usable program code configured to programmatically determine during a course of the re-executing whether a value of the variable changes; and
    computer usable program code configured to deterministically ascertain an existence or non-existence of the non-modifying transform based upon whether the value of the variable changes.

10. The computer program product of claim 6, wherein code configured to identify, execute, capture the hash for initial arguments, capture a hash for final arguments, compare, determine, and perform is code of a profiler.

11. The computer program product of claim 6, wherein code configured to identify, execute, capture the hash for initial arguments, capture a hash for final arguments, compare, determine, and perform is code of a source code debugger within which the identified source code has been loaded.

* * * * *